United States Patent [19]
Jensen et al.

[11] 3,857,988
[45] Dec. 31, 1974

[54] METHOD OF THAWING DEEP-FROZEN MEAT PRODUCTS

[76] Inventors: Jens-Lauge Bolund Jensen, Fyrrevej 18; Per Julius Leth Møller, Haraldsborgvej 1; Anna Birthe Mortensen, Klevekaer 11, Svogerslev, all of DK-4000 Roskilde, Denmark

[22] Filed: Mar. 31, 1972

[21] Appl. No.: 240,263

[30] Foreign Application Priority Data
Apr. 2, 1971  Denmark............................ 1590/71

[52] U.S. Cl.................. 426/506, 426/520, 426/524, 126/21 A
[51] Int. Cl............................................. A23b 1/06
[58] Field of Search...... 99/194; 426/524, 520, 506; 126/21 A, 62, 165

[56] References Cited
UNITED STATES PATENTS
3,501,620   3/1970   Saver................................ 126/21 A

*Primary Examiner*—A. Louis Monacell
*Assistant Examiner*—R. A. Yoncoskie
*Attorney, Agent, or Firm*—Eric H. Waters

[57] ABSTRACT

Method of unfreezing deep-frozen meat products without causing an unacceptable loss of proteins or utilizing a time consuming treatment by use of a two step process in which, during a first stage of the unfreezing period, air at a temperature above 35°C and below 60°C and a relatively high moisture content, preferably approaching 100%, is circulated about the meat products until the surface temperature of the meat products approaches 30-35°C, whereupon the first unfreezing stage is discontinued abruptly. In the second unfreezing stage, the meat is then exposed to circulating moist air of a temperature between 7°C and 13°C, until a sufficient amount of heat has been supplied to the meat products, whereupon this stage is discontinued. Thorough examinations and tests have shown that this method involves a considerable reduction of the unfreezing time.

2 Claims, No Drawings

METHOD OF THAWING DEEP-FROZEN MEAT PRODUCTS

This invention relates to a method of thawing deep-frozen meat products by exposing the meat to heating in an enclosed space by means of circulating heated air.

Meat products shall here be read as including all kinds of meat, or meat products both raw and processed, 30°-35° C, whereupon the first unfreezing stage is discontinued abruptly, i.e., also carcasses, cut and sliced meat, sausages, etc. The term deep-freezing shall be construed to mean broadly freezing to low temperatures, preferably below −18°C.

Many different methods have been suggested for thawing such deep-frozen meat products, and it has been attempted to use hot water and moderately warm air, but none of the previous methods were found to be quite satisfactory. They either caused an unacceptable loss of proteins or the treatment had to be prolonged so as to be too costly and to involve a certain risk of undesirable bacterial growth. A commonly used method is to place the meat products in ordinary cool store, where the temperature is normally between +8° and +10°C, but the heat transmission to the meat products is relatively poor and requires a very long heating time, during which juice from the meat will ooze out, and that juice contains considerable amounts of proteins.

The specific features of the invention are that during the first stage of the thawing period the supplied air has a temperature above 35°C and below 60°C and a relatively high moisture content, preferably approaching 100%, and that this first unfreezing stage is discontinued abruptly when the surface temperature of the meat products approaches 30°-35°C. In a second thawing stage following immediately upon the first stage the meat is then exposed to circulating moist air of a temperature between 7°C and 13°C, this stage being discontinued when a sufficient amount of heat has been supplied to the meat products to bring their temperature, after complete equalization and without further supply of heat, to the desired end temperature, preferably between 5°C and 10°C.

Thorough examinations and tests have shown that this method involves a considerable reduction of the unfreezing time. For larger pieces of meat, the unfreezing time may easily be reduced to about 18-20 hours, whereas the previously applied unfreezing methods usually have required 2-3 days or even more.

These considerable advantages arise from the fact that the very moist air will cause deposition of condensed water on the surface of the meat, whereby the heat transmission from the ambient air will be supplemented and increased, and the condensation itself in fact produces an effective supply of heat. The condensed water will currently drip off the meat but will not draw appreciable amounts of proteins therefrom, and where relatively hot air, as taught here, is used in the first unfreezing stage, it is possible within a relatively short period of time to supply a very substantial portion, even more than one half of the total amount of heat required for unfreezing the meat, and consequently a minor amount of heat is to be supplied in the second unfreezing stage, in which temperature differences between the surface and the core of the meat products are equalized completely or partially.

The first unfreezing stage, however, is terminated when the temperature on the surface of the meat products approaches the range within which the dripping water condensate will carry off more than insignificant amounts of proteins and meat juice. Moreover, it is desirable, in order to eliminate the risk of bacterial growth, that the temperature of the meat surface be within the range of +10°C − +20°C as briefly as possible, and it is therefore important to bring the temperature down below the critical range as soon as possible. This is done in a space with considerably lower room temperature, but still with considerable moisture content in the air to prevent the meat surface being dried up.

Such a multi-step process can, obviously, be carried out in different ways, for instance by placing the meat products first in a room under the conditions required in the first unfreezing stage and transferring them at the end of that period to another room under the conditions required for the second unfreezing stage. After being treated in that way the meat can be stored in normal manner in an ordinary cool store for a limited period of time until it is to be further processed or transported. The meat products subjected to the unfreezing process should preferably be of approximately the same size and shape, since the process will naturally proceed slightly differently under the influence of those factors. It is also possible to carry out the entire process in a single unit in which the conditions are varied as provided by the invention. The fact that the temperature in the first unfreezing stage is above 35°C, and that a high moisture content and an effective circulation of the air are aimed at, involve the necessity of rapid heating. The temperature, however, must not exceed 60°C, since that would result in disintegration of the meat surface, in fact boiling of the meat, and consequently cause a deterioration in quality.

Specifically, the present invention provides a method of thawing deep-frozen meat products, comprising storing the meat products in a closed space during a first thawing period; treating the stored products with air having a temperature above 35°C and below 60°C and having a relative moisture content as close as possible to 100% by circulating the air evenly within said space at a rate of about 2 to 3 m/sec, until the surface of the meat products reaches a temperature approaching 30°-35°C whereupon the first thawing period is discontinued; and immediately subjecting the meat products to a second thawing period by circulating air at a temperature of 7°-13°C and a relative moisture content of about 90% at such a rate that within 15 to 20 hours a sufficient amount of heat is supplied to the meat products to bring their temperature after complete equalization and without further supply of heat to the desired end temperature, whereupon the heat treatment is discontinued.

In a preferred embodiment of the method according to the invention the air supplied in the first unfreezing stage has a temperature of between 40° and 50°C, preferably about 45°C, and is circulated evenly at a rate of from 2 to 3 m/sec. This produces approximately the optimum conditions so far as the supply of heat is concerned.

These conditions will be particularly favourable if the supplied air has a moisture content of 100%.

To create good thermal contact during the second unfreezing stage the air is effectively circulated and has a high moisture content also in this period. A relative moisture content of about 90% has been found to be expedient.

When the said method is followed it is possible to complete the first unfreezing stage in 1 – 1.5 hours, and the second unfreezing stage then normally lasts from 15 to 20 hours, dependent, of course, on the size of the meat pieces.

EXAMPLE

Hams are one of the meat products which are frequently stored in deep-frozen state to be processed at a later stage, for instance as tinned products. In the treatment of hams by the said method it has been found to be advantageous to use in the first thawing stage, a circulating air at a temperature of +45°C and having a relative moisture content of close to 100%. In the room where the hams were unfrozen, the air circulation was such as to produce a heat transmission coefficient of about 60, and the initial temperature of the hams was −20°C.

After 1 the surface temperature of the hams had reached about +30°C and the center temperature about −7°C. At this moment, the hams were transferred to a cool store with an air temperature of +12°C and a circulation that produced a total heat transmission coefficient of about 13, with the result that the surface temperature dropped rapidly to about +5°C, while the circulating air was maintained at a relative moisture of about 92%. During the next 18 hours, approximately, the surface temperature rose to about +9°C, while the center temperature rose to about +2°C, when the actual thawing process could be regarded as completed, and the final temperature equalization might follow in an ordinary cool store. The total loss of weight was found to be extremely low, and the drippings collected from the hams had a very low content of proteins, so that the total protein loss must be regarded as reduced to a minimum as a result of the specific character of the process and the short unfreezing period. At the same time it was found that the rind of the ham had assumed a very attractive softness which made the hams particularly suitable for cutting.

The unfreezing or thawing of hams and other large pieces of meat is naturally attended with particular difficulties, whereas such a process, will proceed at a much faster rate when the pieces are smaller the smallest thickness of the pieces playing an essential part for the course of the unfreezing process. But under all circumstances it is important to ensure that the surface temperature in the first unfreezing stage does not exceed the stated limit. When keeping within the specified temperature ranges the optimum results will be achieved, and thus result in the shortest unfreezing or thawing time and the minimum loss.

What we claim is:

1. A method of thawing deep-frozen raw meat products, comprising storing the frozen raw meat products in a closed space during a first thawing period; treating the stored products with air having a temperature of above 35°C and below 60°C and having a relative moisture content as close as possible to 100% by circulating the air evenly within said space at a rate of about 2 to 3 m/sec, until the surface of the stored products reaches a temperature approaching 30°–35°C, whereupon the first thawing period is discontinued; and immediately subjecting the stored products having a surface temperature of 30°–35°C to a second thawing period by circulating air at a temperature of 7°–13°C and a relative moisture content of about 90% at such a rate that within 15 to 20 hours a sufficient amount of heat is supplied to the meat products subjected to said second thawing period to bring their temperature after complete equalization and without further supply of heat to the desired end temperature, whereupon the heat treatment is discontinued.

2. A method of thawing deep-frozen raw meat products, comprising storing the frozen raw meat products in a closed space during a first thawing period; treating the stored raw meat products with air having a temperature of from 40°C to 50°C and having a relative moisture content of 100% by circulating the air evenly within the said space at a rate of about 2 to 3 m/sec until the surface of the stored raw meat products reaches a temperature approaching 30°–35°C, whereupon the first thawing period is discontinued; and immediately subjecting the stored raw meat products having said temperature approaching 30°–35°C to a second thawing period by circulating air at a temperature of 7°–13°C and a relative moisture content of about 90% at such a rate that within 15 to 20 hours a sufficient amount of heat is supplied to the raw meat products subjected to said second thawing period to bring their temperature after complete equalization and without further supply of heat to the desired end temperature, whereupon the heat treatment is discontinued.

* * * * *